(12) United States Patent
Soltis et al.

(10) Patent No.: US 7,360,072 B1
(45) Date of Patent: *Apr. 15, 2008

(54) ISCSI SYSTEM OS BOOT CONFIGURATION MODIFICATION

(75) Inventors: Edward Alan Soltis, Elk River, MN (US); Charles Steven Rissmeyer, Coon Rapids, MN (US)

(73) Assignee: Cisco Technology, Inc., San Jose, CA (US)

( * ) Notice: Subject to any disclaimer, the term of this patent is extended or adjusted under 35 U.S.C. 154(b) by 354 days.

This patent is subject to a terminal disclaimer.

(21) Appl. No.: 10/402,204

(22) Filed: Mar. 28, 2003

(51) Int. Cl.
*G06F 15/177* (2006.01)
(52) U.S. Cl. ............... 713/2; 713/1; 709/222
(58) Field of Classification Search ........ 713/1, 713/2; 709/222
See application file for complete search history.

(56) References Cited

U.S. PATENT DOCUMENTS 5,628,692 A * 5/1997 Mowers et al. ............ 473/73
5,996,024 A * 11/1999 Blumenau .................. 719/326
6,105,130 A * 8/2000 Wu et al. ..................... 713/2
6,434,695 B1 * 8/2002 Esfahani et al. .............. 713/2
6,609,151 B1 * 8/2003 Khanna et al. ............ 709/222
6,658,459 B1 * 12/2003 Kwan et al. ............... 709/217
6,857,069 B1 * 2/2005 Rissmeyer et al. ........... 713/2
2003/0097553 A1 * 5/2003 Frye, Jr. ...................... 713/2
2003/0126242 A1 * 7/2003 Chang ....................... 709/222
2003/0140191 A1 * 7/2003 McGowen et al. ......... 710/302
2003/0196126 A1 * 10/2003 Fung .......................... 713/300
2004/0030668 A1 * 2/2004 Pawlowski et al. ........... 707/1
2004/0138868 A1 * 7/2004 Kuznetsov et al. .......... 703/25
2004/0153694 A1 * 8/2004 Nicholson et al. ............ 714/4

* cited by examiner

*Primary Examiner*—A. Elamin
*Assistant Examiner*—Fahmida Rahman
(74) *Attorney, Agent, or Firm*—Schwegman, Lundberg & Woessner, P.A.

(57) ABSTRACT

A Pre-boot Execution Environment (PXE) boot extension is loaded upon system boot and is operable to store an iSCSI boot disk identifier identifying a remote disk drive to a shared memory location. As an operating system is loaded via iSCSI over a network connection to a remote disk, an operating system iSCSI driver is loaded. The operating system iSCSI driver reads the boot disk identifier stored in the shared memory location and uses the boot disk identifier to configure the operating system.

17 Claims, 2 Drawing Sheets

ISCSI SYSTEM OS BOOT CONFIGURATION MODIFICATION

FIELD OF THE INVENTION

The invention relates generally to booting computers, and more specifically to a system and method for modifying the operating system (OS) boot configuration in a computer system using iSCSI.

BACKGROUND OF THE INVENTION

Computers traditionally use built-in code known as a BIOS (Basic Input/Output System) to perform initial boot functions and to control certain attached devices before loading an operating system or other software. This enables a computer to receive input from a keyboard and to output data to a display, and further provides the computer with control of devices such as serial communications ports and disk drives.

When booting, a personal computer typically either executes the BIOS from ROM or flash memory, or loads the BIOS into RAM and executes the BIOS code from RAM to perform initial testing, configuration, and to initialize loading an operating system. Although operating systems are traditionally loaded from hard disks or diskette drives, BIOS extensions such as the PXE or Preboot eXecution Environment provide a computer system the ability to establish a network connection before loading an operating system, and to boot over the network connection via a network bootstrap program. Various other BIOS extensions provide the ability to boot via USB or other devices, but typically require a specially configured bios extension or system BIOS to implement.

The various diskless boot options discussed here require a computer system to have a specialized network interface card or a customized system BIOS, and so may be somewhat difficult to implement in existing systems or with many off-the-shelf parts. A boot option enabling a computer system having neither a custom network interface card nor a custom system BIOS is therefore desirable.

SUMMARY OF THE INVENTION

The present invention provides in one embodiment a system and method of booting a computer via iSCSI, comprising loading a Pre-boot Execution Environment (PXE) boot ROM extension that is operable to store an iSCSI boot disk identifier identifying a remote disk drive to a shared memory location. As an operating system is loaded via iSCSI over a network connection from a remote disk, an operating system iSCSI driver is loaded. The operating system iSCSI driver reads the boot disk identifier stored in the shared memory location and uses the boot disk identifier to configure the operating system.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

Figure 1:
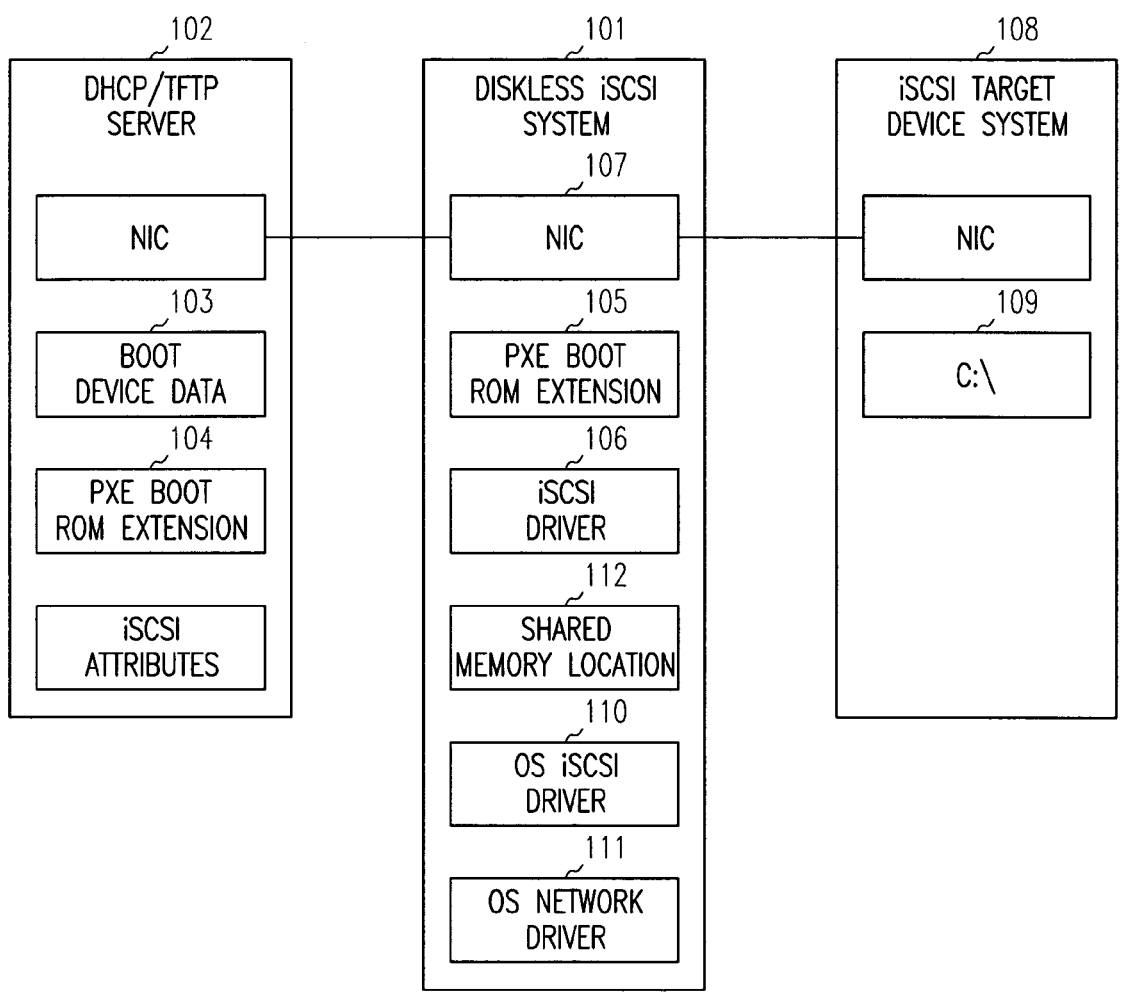
FIG. 1 shows a diagram illustrating the boot sequence of a diskless iSCSI system, consistent with an embodiment of the present invention.

FIG. 1 shows a diagram illustrating the boot configuration of a diskless iSCSI system, consistent with an embodiment of the present invention. The diskless iSCSI system shown here is but one example of a computerized device that can boot using the method of the present invention.

In this example, the diskless iSCSI system 101 requests boot information from DHCP server 102, and receives in response boot device data 103 including the system's IP address and default router, the TFTP server and filename of the PXE boot ROMextension to be loaded, and iSCSI attributes such as the iSCSI device IP address and logical unit number (LUN). The PXE boot ROM extension further stores an iSCSI boot disk or volume identifier that is stored in a shared memory location 112 of the diskless iSCSI system 101. The diskless system also uses its built-in TFTP to download the PXE bootROM extension 104 from a TFTP server, which in this example is also server 102.

With this information loaded in the diskless system 101, the PXE boot ROM extension 105 downloaded from the TFTP server 102 is executed and intercepts INT13 disk operations from the diskless system's BIOS, turning them into iSCSI calls through a micro-iSCSI stack of an iSCSI driver 106 loaded as part of the ROM extensions. Universal Network Device Interface (UNDI) drivers in the system's BIOS facilitate communication with the network adapter or network interface card 107, which provides the network interface for the iSCSI network communications.

The diskless iSCSI system 101 then logs in to the remote iSCSI target device system 108, providing a network interface to the intended boot volume 109 and loads the operating system, drivers, and other related data. Here, the system also loads a second iSCSI driver 110 that is operating system-specific, which will replace the iSCSI driver loaded earlier. The operating system iSCSI driver 110 uses the boot disk identifier stored in shared memory location 112 to configure the operating system to recognize and use the boot volume iSCSI device as a virtual local volume, so that the diskless iSCSI system 101 can use the volume 109 to load and store data as is needed to finish booting the operating system and to access other system disk data.

In some embodiments of the invention, an operating system network driver 111 is loaded before the operating system iSCSI disk driver is loaded, so that the iSCSI disk driver can communicate with other systems via the network driver 111 and network interface card 107 immediately upon loading. Once the operating system and drivers are loaded, the BIOS starts the operating system and the operating system takes over control of the diskless iSCSI device 101 identified in shared memory location 112.

When loading, the operating system accesses the root drive through the first or micro-iSCSI driver initially loaded, and loads registry settings, configuration files, and other drivers. This step is performed to start the operating system network stack and iSCSI driver so that control can be transferred from the micro-iSCSI driver and UNDI driver. Once the network stack and operating system-specific iSCSI drivers are loaded and started, control is transferred from the micro iSCSI driver and the UNDI driver to the operating system's iSCSI and network drivers. The operating system is then loaded and fully operational, and is capable of performing iSCSI disk operations to the boot volume identified in shared memory location 112 or other SCSI volumes or devices via the second or operating system-specific iSCSI driver 110.

In various embodiments of the invention the operating system may be any operating system, including Microsoft Windows and UNIX, including Unix versions such as Linux, AIX, or Sun UNIX. Although the various devices shown in FIG. 1 are identified using various names, the various computerized systems and servers may take any form, including routers, networked appliances, set top boxes, telecommunications equipment, or any other form consistent with the invention as claimed in the appended claims.

In one example embodiment in which the operating system is Microsoft Windows®, the iSCSI driver issues an IoCreateSymbolicLink to link the remote disk volume 109 identified in shared memory location 112 to a Windows ArcName disk drive partition identifier. The system is queried via the Windows iSCSI driver for a SymbolicLinkObject corresponding to a boot partition of the remote disk drive volume 109, which is identified by the iSCSI boot disk identifier stored in shared memory location 112. The Windows® registry is then modified to set a SystemPartition value to the remote disk drive's system partition. This method allows the Windows® operating system to boot via iSCSI without requiring creation and maintenance of an additional Windows® Primary Disk drivers, and so facilitates the efficient operation of the diskless iSCSI boot system.

Figure 2:
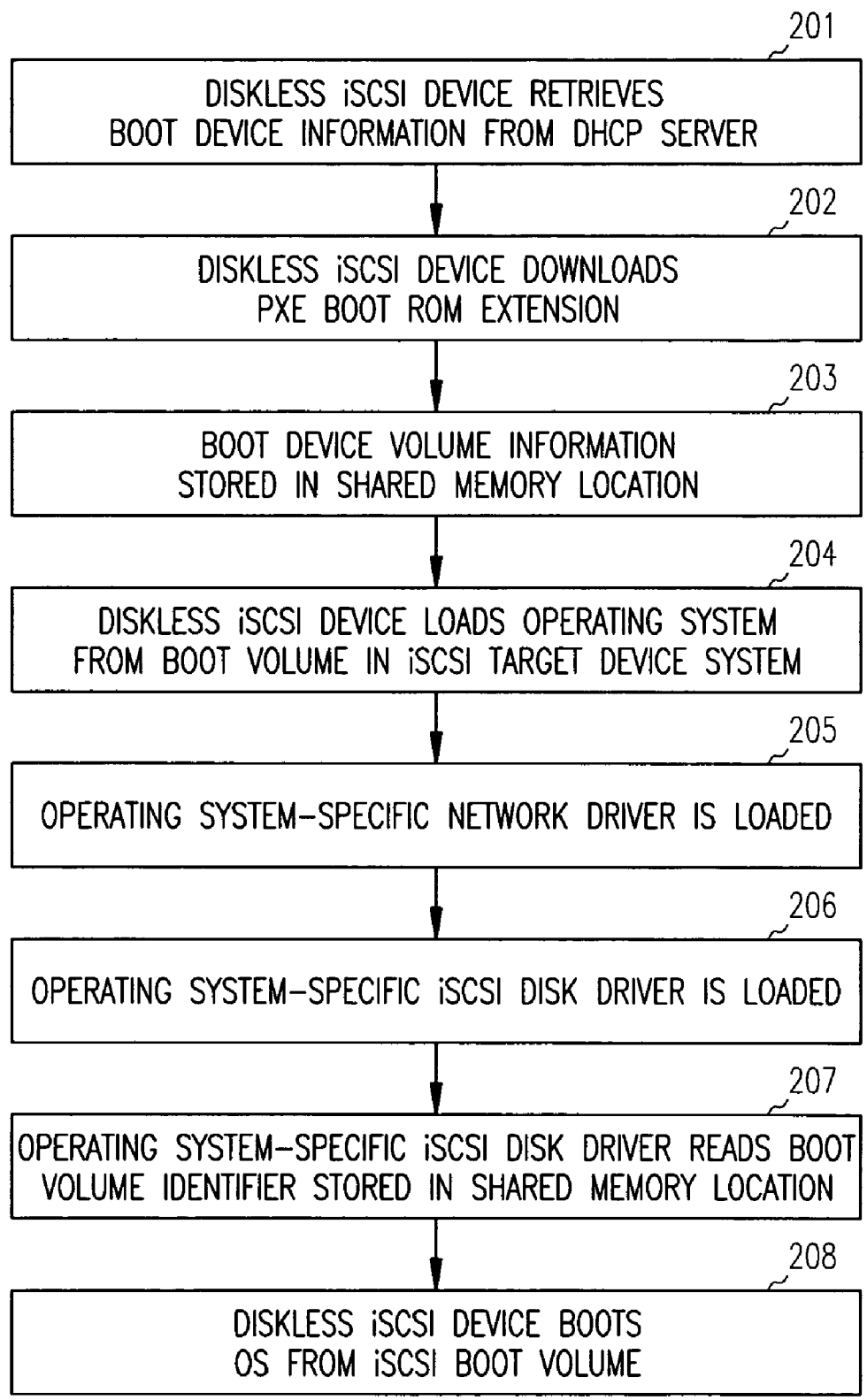
FIG. 2 shows a diagram illustrating a computerized system configuration consistent with an embodiment of the present invention.

FIG. 2 shows a flowchart, illustrating the operation of one embodiment of the invention as may be performed on a system such as that shown in FIG. 1.

A computerized networked diskless iSCSI system such as diskless iSCSI system 101 includes a system BIOS (Basic Input/Output System) that uses a built-in UNDI (Universal Network Device Interface) driver operating in its PXE (Pre-boot eXecution Environment) to request boot information from a DHCP server at 201. The DHCP server returns the boot information to the diskless iSCSI system, including the boot device's IP address and default router, the TFTP server and PXE boot ROM extension filename and server, and the target iSCSI boot device's IP address, target name, and LUN (Logical Unit Number).

The diskless iSCSI system then uses its built-in TFTP extension to download the appropriate PXE boot ROM extension at 202 from the TFTP server identified by the DHCP server. In the example configuration shown in FIG. 1, the DHCP server module and the TFTP server module exist within the same computerized networked device 102 which provides both boot device data 103 and the PXE boot ROM extension 104, but in other embodiments will exist in different networked computerized devices. The downloaded PXE boot ROM extension stores the boot device volume identifier in a shared memory location at 203.

The downloaded PXE boot ROM extension comprises an INT13 software layer that is operable to intercept INT13 calls and convert them to iSCSI read and write commands, and to use the micro-iSCSI driver and micro TCP driver to send the iSCSI commands to computerized network device which contains the boot disk volume. The diskless iSCSI device loads the operating system from the boot volume 109 at 204, and loads an operating-specific network driver at 205 and an operating system-specific bootable iSCSI disk driver at 206. When the operating system loads the operating system-specific iSCSI disk driver, the iSCSI disk driver reconnects to the iSCSI device, causing any TCP connections made through the micro-iSCSI driver to be closed, and switches over to use the normal iSCSI path operating through the operating system-specific network and bootable iSCSI drivers. The operating system identifies the boot volume by accessing the boot volume identifier at 207 that was previously stored in the shared memory location at 203, and proceeds to complete the operating system boot process at 208. At this point, the diskless iSCSI system is booted, and is operable to access the boot volume as well as other volumes or devices via its iSCSI and network drivers.

The method and systems described here do not require special hardware to operate and require only standard protocols including DHCP, TFTP and iSCSI. Two pieces of specialized software are provided in the embodiments described here to enable operation, which are the PXE boot ROM extension and the bootable iSCSI driver loaded in the booting operating system.

The bootable iSCSI driver loaded at 206 is distinct from a traditional iSCSI driver in its structure, which includes modules providing specific functions. A multiplexing layer receives SCSI commands from a SCSI port driver, and determines how to route the received command. If the operating system network drivers are loaded and enabled, the normal iSCSI path using the operating system network drivers is used. If the operating system network drivers are not loaded and enabled but the PXE UNDI or other network drivers are available, the micro-iSCSI driver is used along with the micro-TCP driver. If neither driver is yet loaded, the request is rejected. This driver is further operable to identify the boot volume using the shared memory location also accessible to the PXE boot applications to store the boot volume identifier data. This enables the operating system-specific iSCSI driver loaded at 206 to configure the operating system to recognize the iSCSI boot volume as the boot device, such as by altering the Microsoft Windows® registry.

The normal iSCSI path is also provided in this example embodiment via the bootable iSCSI driver, and handles all iSCSI requests once the operating system network driver is active and enabled. The micro-iSCSI path is used only if the operating system network drivers are not yet loaded and enabled, and is then used only between the time when the operating system is first executed and when the operating system network drivers are loaded and enabled. It uses the micro-iSCSI and micro-TCP drivers from the PXE boot ROM extension to allow the operating system to access the boot volume and other iSCSI volumes before the normal operating system network services are available.

Once booted, the networked device will be operable via the normal iSCSI channel to access the boot volume, including applications and data. The diskless iSCSI device will also be able to access other volumes via iSCSI just as a traditional computerized system may access more than one directly attached SCSI device, so that it may access applications and other data from volumes other than the boot volume. It is desired in this embodiment of the invention that each diskless iSCSI device have its own boot volume, just as each traditional computer has its own boot volume, so that configuration, registry, swap, and other files and configuration settings unique to each computer are not overwritten by other computerized systems.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

The invention claimed is:

1. A method of booting a networked computerized system comprising:
    loading a Pre-boot Execution Environment (PXE) boot extension in a booting computer, the PXE boot extension operable to store an iSCSI boot disk identifier identifying a remote disk drive to a shared memory location in a booting computer;
    loading an operating system in the booting computer via iSCSI over a network connection to a remote disk via a first iSCI driver;
    loading an operating system-specific second iSCSI driver in the booting computer, wherein the loading comprises reading the boot disk identifier stored in the shared memory location and using the boot disk identifier to configure the operating system; and
    transferring network interface and SCSI control of the booting computer from the PXE boot extension to the operating system.

2. The method of claim 1, wherein the operating system is a Microsoft Windows® operating system and the operating system-specific second iSCSI driver is a Microsoft Windows iSCSI driver.

3. The method of claim 2, wherein the Microsoft Windows® iSCSI driver issues an IoCreateSymbolicLink to link the remote disk drive identified by the stored iSCSI boot disk identifier to a Microsoft Windows ArcName disk drive partition identifier.

4. The method of claim 2, wherein a primary disk driver is loaded to enable Microsoft Windows® to access the remote disk drive identified by the iSCSI boot disk identifier.

5. The method of claim 1, wherein the PXE boot extension comprises the first iSCSI driver and a TCP driver.

6. The method of claim 5, wherein the PXE boot extension's iSCSI driver is operable to transport SCSI commands over a TCP/IP connection via the TCP driver.

7. A method of booting a networked computerized system comprising:
    loading a Pre-boot Execution Environment (PXE) boot extension in a booting computer, the PXE boot extension operable to store an iSCSI boot disk identifier identifying a remote disk drive to a shared memory location in a booting computer;
    loading an operating system in the booting computer via iSCSI over a network connection to a remote disk via a first iSCI driver;
    loading an operating system-specific second iSCSI driver in the booting computer, wherein the loading comprises reading the boot disk identifier stored in the shared memory location and using the boot disk identifier to configure the operating system;
    wherein the operating system is a Microsoft Windows® operating system and the operating system-specific second iSCSI driver is a Microsoft Windows iSCSI driver; and
    querying the system via the Microsoft Windows® iSCSI driver for a SymbolicLinkObject corresponding to a boot partition of the remote disk drive identified by the stored iSCSI boot disk identifier; and
    modifying the registry to set a SystemPartition value to the remote disk drive's system partition.

8. A networked computerized system comprising:
    a network interface card comprising a part of a first computer;
    a Pre-boot Execution Environment (PXE) boot extension, the PXE boot extension operable to store an iSCSI boot disk identifier identifying a remote disk drive to a shared memory location in the first computer;
    a first iSCSI driver stored in the first computer operable to transport SCSI commands over the TCP/IP connection to provide access to a bootable operating system stored on a second computer; and
    a software module stored in the first computer and operable to boot the networked computerized system from the bootable operating system stored on the second computer via the SCSI commands transported over the TCP/IP connection, and to load and execute an operating system-specific second iSCSI driver in the first computer, wherein executing the operating system-specific second iSCSI driver comprises reading the boot disk identifier stored in the shared memory location and using the boot disk identifier to configure the operating system, the software module further operable to transfer network interface and SCSI control of the networked computerized system from the PXE boot extension to the booted operating system.

9. The networked computerized system of claim 8, wherein the operating system is a Microsoft Windows® operating system and the operating system-specific iSCSI driver is a Microsoft Windows iSCSI driver.

10. The networked computerized system of claim 9, wherein the Microsoft Windows® iSCSI driver issues an IoCreateSymbolicLink to link the remote disk drive identified by the stored iSCSI boot disk identifier to a Microsoft Windows ArcName disk drive partition identifier.

11. The networked computerized system of claim 9, wherein the software module is further operable to load a primary disk driver to enable Microsoft Windows® to access the remote disk drive identified by the iSCSI boot disk identifier.

12. The networked computerized system of claim 8, wherein the PXE boot extension comprises the first iSCSI driver and a TCP driver.

13. The networked computerized system of claim 12, wherein the PXE boot extension's iSCSI driver is operable to transport SCSI commands over a TCP/IP connection via the TCP driver.

14. A networked computerized system comprising:
    a network interface card comprising a part of a first computer;
    a Pre-boot Execution Environment (PXE) boot extension, the PXE boot extension operable to store an iSCSI boot disk identifier identifying a remote disk drive to a shared memory location in the first computer;
    a first iSCSI driver stored in the first computer operable to transport SCSI commands over the TCP/IP connection to provide access to a bootable operating system stored on a second computer; and
    a software module stored in the first computer and operable to boot the networked computerized system from the bootable operating system stored on the second computer via the SCSI commands transported over the TCP/IP connection, and to load and execute an operating system-specific second iSCSI driver in the first computer, wherein executing the operating system-specific second iSCSI driver comprises reading the boot disk identifier stored in the shared memory location and using the boot disk identifier to configure the operating system;

wherein the Microsoft Windows® iSCSI driver issues an IoCreateSymbolicLink to link the remote disk drive identified by the stored iSCSI boot disk identifier to a Microsoft Windows ArcName disk drive partition identifier;

the software module further operable to query the system via the Microsoft Windows® iSCSI driver for a SymbolicLinkObject corresponding to a boot partition of the remote disk drive identified by the stored iSCSI boot disk identifier, and modify the registry to set a SystemPartition value to the remote disk drive's system partition.

15. A method of booting a networked computerized system comprising:
loading a Pre-boot Execution Environment (PXE) boot extension comprising:
a software module that intercepts INT13 calls and converts them to SCSI read and write commands;
a first iSCSI driver operable to send SCSI read and write commands over a TCP/IP connection;
a TCP stack providing a TCP implementation for the first iSCSI driver; and
a software module operable to store an iSCSI boot disk identifier identifying a remote disk drive to a shared memory location;
transporting SCSI commands over the TCP/IP connection to provide access to a bootable operating system stored on a second networked computerized system via the first iSCSI driver and TCP stack;
booting the networked computerized system from the bootable operating system stored on the second networked computerized system via the SCSI commands transported over the TCP/IP connection;
loading and executing an operating system-specific second iSCSI driver, wherein the executing comprises reading the boot disk identifier stored in the shared memory location and using the boot disk identifier to configure the operating system; and
transferring network interface and SCSI control of the networked computerized system from the PXE boot extension to the operating system.

16. A networked computerized system, comprising:
a Pre-boot Execution Environment (PXE) boot extension comprising:
a software module that intercepts INT13 calls and converts them to SCSI read and write commands;
a micro-iSCSI driver operable to send SCSI read and write commands over a TCP/IP connection; and
a micro-TCP stack providing a TCP/IP implementation for the micro-iSCSI driver; and
a software module operable to store an iSCSI boot disk identifier identifying a remote disk drive to a shared memory location;
the PXE boot extension operable to transport SCSI commands over the TCP/IP connection to provide access to a bootable operating system stored on a second networked computerized system via the micro-iSCSI driver and micro-TCP stack;
a software module operable to boot the networked computerized system from the bootable operating system stored on the second networked computerized system via the SCSI commands transported over the TCP/IP connection, booting the networked computerized system comprising:
loading and executing an operating system iSCSI driver, wherein the executing comprises reading the boot disk identifier stored in the shared memory location and using the boot disk identifier to configure the operating system; and
transferring network interface and SCSI control of the networked computerized system from the PXE boot extension to the operating system.

17. A method of booting a computerized system comprising:
loading a software module in a booting computer, the software module operable to store an iSCSI boot disk identifier identifying a remote disk drive to a shared memory location in the booting computer;
loading an operating system in the booting computer via iSCSI over a network connection to a remote disk via a first iSCSI driver;
loading and executing an operating system-specific second iSCSI driver, wherein the executing comprises reading the boot disk identifier stored in the shared memory location and using the boot disk identifier to configure the operating system; and
transferring network interface and SCSI control of the networked computerized system from the PXE boot extension to the operating system.

* * * * *